(12) United States Patent
Xu et al.

(10) Patent No.: US 11,499,041 B2
(45) Date of Patent: Nov. 15, 2022

(54) PHOTO-CROSSLINKED RUBBER COMPOSITION, AND RUBBER PRODUCT USING THE SAME

(71) Applicant: HANGZHOU XINGLU TECHNOLOGIES CO., LTD, Zhejinag (CN)

(72) Inventors: Tao Xu, Hangzhou (CN); Zhi Sheng Fu, Hangzhou (CN); An Yang Wu, Hangzhou (CN)

(73) Assignee: HANGZHOU XINGLU TECHNOLOGIES CO., LTD., Zhejiang (CN)

( * ) Notice: Subject to any disclaimer, the term of this patent is extended or adjusted under 35 U.S.C. 154(b) by 601 days.

(21) Appl. No.: 16/477,691

(22) PCT Filed: Jan. 12, 2018

(86) PCT No.: PCT/CN2018/072360
§ 371 (c)(1),
(2) Date: Jul. 12, 2019

(87) PCT Pub. No.: WO2018/130191
PCT Pub. Date: Jul. 19, 2018

(65) Prior Publication Data
US 2019/0352492 A1 Nov. 21, 2019

(30) Foreign Application Priority Data

Jan. 13, 2017 (CN) .......................... 201710024894.1
Jan. 10, 2018 (CN) .......................... 201810020837.0

(51) Int. Cl.
| | | |
|---|---|---|
| C08F 2/46 | (2006.01) |
| C08F 2/50 | (2006.01) |
| C08G 61/04 | (2006.01) |
| C08L 23/16 | (2006.01) |
| C08K 3/22 | (2006.01) |
| C08K 3/36 | (2006.01) |
| C08K 5/00 | (2006.01) |
| C08K 5/3492 | (2006.01) |
| C08K 5/54 | (2006.01) |
| C08L 23/06 | (2006.01) |
| C08L 23/26 | (2006.01) |
| C08K 3/26 | (2006.01) |

(52) U.S. Cl.
CPC .............. *C08L 23/16* (2013.01); *C08K 3/22* (2013.01); *C08K 3/36* (2013.01); *C08K 5/005* (2013.01); *C08K 5/0016* (2013.01); *C08K 5/0025* (2013.01); *C08K 5/34924* (2013.01); *C08K 5/5403* (2013.01); *C08L 23/06* (2013.01); *C08L 23/26* (2013.01); *C08K 2003/2206* (2013.01); *C08K 2003/2217* (2013.01); *C08K 2003/2296* (2013.01); *C08K 2003/265* (2013.01); *C08L 2023/44* (2013.01); *C08L 2203/02* (2013.01); *C08L 2203/202* (2013.01); *C08L 2312/06* (2013.01); *C08L 2666/02* (2013.01)

(58) Field of Classification Search
CPC .... C08K 5/005; C08K 5/0025; C08K 5/5403; C08K 5/34924; C08K 5/0016; C08K 2003/2206; C08K 2003/265; C08K 2003/2217; C08K 2003/2296; C08L 23/16; C08L 23/26; C08L 23/06; C08L 2666/02; C08L 2203/02; C08L 2203/202; C08L 2312/06; C08L 2312/08; C08L 2312/00; C08L 2023/44; C08L 2207/02
USPC ................ 522/31, 6, 189, 184, 71, 1; 520/1
See application file for complete search history.

(56) References Cited

U.S. PATENT DOCUMENTS

| | | | |
|---|---|---|---|
| 6,103,658 A | 8/2000 | Mackenzie et al. |
| 6,660,677 B1 | 12/2003 | Mackenzie et al. |

FOREIGN PATENT DOCUMENTS

| | | |
|---|---|---|
| CN | 101028888 A | 9/2007 |
| CN | 101434728 A | 5/2009 |
| CN | 101486819 A | 7/2009 |
| CN | 101531725 A | 9/2009 |
| CN | 101812145 A | 8/2010 |
| CN | 102161801 A | 8/2011 |

(Continued)

OTHER PUBLICATIONS

Polymer Database, Initiation by Diacyl Peroxides, Jan. 23, 2017 (Year: 2017).*
Fu et al, CN 103980596 Machine Translation, Aug. 13, 2014 (Year: 2014).*
Fu et al, CN 104877225 Machine Translation, Sep. 2, 2015 (Year: 2015).*

(Continued)

*Primary Examiner* — Jessica Whiteley
(74) *Attorney, Agent, or Firm* — Lorenz & Kopf, LLP

(57) ABSTRACT

The present invention discloses a photo-crosslinked rubber composition and application thereof. The rubber composition comprises a rubber matrix and an initiator. Based on 100 parts by weight of the rubber matrix, the rubber matrix comprises a branched polyethylene with a content represented as A, in which $0<A\leq100$, and an ethylene-propylene rubber with a content represented as B, in which $0\leq B<100$; and the initiator accounts for 0.1-10 parts, and the initiator includes at least one of a cationic photoinitiator and a free radical photoinitiator. In the rubber composition, the ethylene-propylene rubber is partially or completely replaced by the branched polyethylene. The rubber composition can be used for rubber product crosslinked by ultraviolet light, including wire, cable, film, glove, condom, and medical catheter, which achieves excellent elasticity, electrical insulation property, aging resistance and ozone resistance, and also has good mechanical strength.

14 Claims, No Drawings

(56) References Cited

FOREIGN PATENT DOCUMENTS

| | | | |
|---|---|---|---|
| CN | 102827312 A | | 12/2012 |
| CN | 103980596 | * | 8/2014 |
| CN | 103980596 A | | 8/2014 |
| CN | 104877225 | * | 9/2015 |
| CN | 104877225 A | | 9/2015 |
| CN | 104910487 | * | 9/2015 |
| CN | 104910487 A | | 9/2015 |
| CN | 104926962 A | | 9/2015 |
| JP | S59215342 | | 12/1984 |

OTHER PUBLICATIONS

Fu et al, CN 104910487 Machine Translation, Sep. 16, 2015 (Year: 2015).*

SIPO, International Search Report issued in IA No. PCT/CN2018/072360 dated Apr. 29, 2019.

* cited by examiner

PHOTO-CROSSLINKED RUBBER COMPOSITION, AND RUBBER PRODUCT USING THE SAME

CROSS REFERENCE TO RELATED APPLICATIONS

The present application is the U.S. national phase of and claims priority to International Patent Application No. PCT/CN2018/072360 filed on Jan. 12, 2018, which claims the benefit of priority from China National Application No. 201710024894.1, filed on Jan. 13, 2017 and China National Application No. 201810020837.0, filed on Jan. 10, 2018, the entire content of each of which is incorporated herein by reference into the present disclosure as if fully set forth herein.

TECHNICAL FIELD

The present invention belongs to the technical field of rubber, and particularly relates to a photo-crosslinked rubber composition and a processing method thereof, and application of the rubber composition.

BACKGROUND

Ethylene-propylene rubber has excellent elasticity, electrical insulation properties, aging resistance and ozone resistance. When the ethylene-propylene rubber is applied to applications where high performance is required, the crosslinking methods used mainly include a peroxide vulcanization method and a high-energy radiation method. The high-energy radiation method limits its application due to factors such as high equipment investment and harsh protective measures. The peroxide vulcanization method has high energy consumption and low production efficiency due to the need for crosslinking for a long period of time. Ultraviolet light crosslinking is a new crosslinking process developed in recent years. It has the advantages of simple process, low investment, easy operation, less stringent safety protection requirements, convenient maintenance, high energy utilization rate and no pollution to the environment. However, it can be seen from the Chinese patents CN101434728 and CN101486819 that ultraviolet light crosslinking is easily affected by the filler and inferior processing properties and mechanical properties are obtained, which affects the use performance and application range of the material.

How to improve the performance of a rubber composition to make it better suited to applications where both aging resistance and mechanical properties are required is an ongoing technical problem.

Ethylene-propylene rubbers are a kind of synthetic rubbers with a saturated molecular backbone, and include ethylene-propylene monomer (EPM) and ethylene-propylene-diene monomer (EPDM), both of which have good aging resistance. EPDM is commonly used in the ethylene-propylene rubber products. However, since the EPDM contains a third monomer with a molecular chain having a double bond and the EPM has a completely saturated molecular chain, the EPM has more excellent aging resistance. Therefore, in a situation where a higher requirement is raised for the aging resistance, it is a common technical solution to use the EPM in combination to improve the aging resistance of the EPDM. However, the mechanical strength of the EPM is low, which affects the overall physical and mechanical properties.

The EPM is a copolymer of ethylene and propylene, which is a copolymer of ethylene and an α-olefin. The copolymer of ethylene and an α-olefin is a polymer containing only carbon and hydrogen elements and having a saturated molecular chain. The common types of carbon atoms found in such polymers generally include primary, secondary and tertiary carbons, in which the tertiary carbon is most susceptible to hydrogen abstraction to form a free radical. Accordingly, the proportion of tertiary carbon atoms in all carbon atoms is generally considered to be a major factor affecting the aging resistance of ethylene/α-olefin copolymers. The lower the proportion is, the better the aging resistance will be. The proportion can be expressed by the degree of branching. For example, EPM having a propylene content of 60% by weight can be calculated to contain 200 propylene units, that is, 200 tertiary carbon atoms or 200 methyl branches, per 1000 carbon atoms, so the degree of branching is 200 branches/1000 carbon atoms. The EPM usually has an ethylene content of 40-65% or 40-60% by weight, so the degree of branching is generally in the range of 117-200 branches/1000 carbon atoms or 133-200 branches/1000 carbon atoms. This degree of branching is considered to be higher than that of other common ethylene/α-olefin copolymers.

In the prior art, the α-olefin in the common ethylene/α-olefin copolymers may include, in addition to propylene, an α-olefin having a carbon number of not less than 4, which may be selected from a $C_4$-$C_{20}$ α-olefin, and is generally selected from 1-butene, 1-hexene and 1-octene. If the degree of branching of an ethylene/α-olefin copolymer is too low, the melting point and crystallinity are too high, so it is not suitable for use as a rubber component. If the degree of branching is too high, the content of α-olefin is high, which leads to a higher process difficulty and raw material cost, and a lower operability and economical efficiency. In the prior art, a polyolefin obtained by copolymerizing ethylene with 1-butene or ethylene with 1-octene can be referred to as a polyolefin plastomer or a polyolefin elastomer according to the magnitudes of crystallinity and melting points. Due to their proper crystallinity and melting points, some polyolefin elastomer brands can be well used in combination with an ethylene-propylene rubber and have a low degree of branching, so they are considered to be an ideal material for improving the aging resistance of ethylene-propylene rubbers, and can be used in place of ethylene-propylene rubbers to some extent. Since an ethylene/1-octene copolymer has more flexible molecular chain, higher rubber elasticity, and better mechanical performance than an ethylene/1-butene copolymer, the polyolefin elastomer commonly used in rubber products is generally a copolymer of ethylene and 1-octene at present, in which the octene content in percentage by weight is generally not higher than 45%, and more generally not higher than 40%, and the corresponding degree of branching is generally not higher than 56 branches/1000 carbon atoms, and more generally not higher than 50 branches/1000 carbon atoms, which is much lower than the degree of branching of EPM. Therefore, the ethylene/1-octene copolymer has excellent aging resistance and good physical and mechanical properties.

Rubbers are usually used after crosslinking. Among common crosslinking methods for ethylene-propylene rubbers, peroxide crosslinking or irradiation crosslinking can be suitably used for a copolymer of ethylene and an α-olefin. The photo-crosslinking described in the related art of the present invention is also a type of irradiation crosslinking, which mainly comprise: forming a tertiary carbon radical by hydrogen abstraction from a tertiary carbon and then creating a carbon-carbon crosslink by free radical bonding. However, an ethylene/1-octene copolymer (hereinafter referred to as POE) has a low number of tertiary carbon atoms and has a longer branch attached to the tertiary carbon atom, so the steric hindrance is large, and free radical reaction is difficult to occur, resulting in difficulty in crosslinking, and affecting the processing efficiency and product performance.

Therefore, there is currently a need for a better technical solution, which can improve the aging resistance of ethylene-propylene rubbers while the rubber composition has good physical and mechanical properties and crosslinking performances, and is expected to behave well with respect to particular functional performances of rubber products (for example, electrical insulation performance).

SUMMARY

The present invention provides a photo-crosslinked rubber composition in view of the technical defects of the prior art that the peroxide vulcanization method, the high-energy radiation method, and ultraviolet light crosslinking have low efficiency in production of ethylene-propylene rubber. The rubber composition adopts a branched polyethylene having a degree of branching of not less than 50 branches/1000 carbons to partially or completely replace ethylene-propylene rubber, and the application of the rubber composition and the method for producing the same are also provided.

In order to achieve the objectives, the technical solution adopted in the present invention provides a rubber composition comprising a rubber matrix and an initiator. The rubber matrix comprises a branched polyethylene with a content represented as A, in which $0<A\leq100$, and an ethylene-propylene rubber with a content represented as B, in which $0\leq B<100$; based on 100 parts by weight of the rubber matrix, the initiator accounts for 0.1-10 parts, and the initiator includes at least one of a cationic photoinitiator and a free radical photoinitiator, wherein the branched polyethylene has a degree of branching of not less than 50 branches/1000 carbon atoms, a weight average molecular weight of not less than 50,000, and a Mooney viscosity ML (1+4) at 125° C. of not less than 2.

In the prior art, "branched polyethylene" refers to, in addition to an ethylene homopolymer having branches, a saturated vinyl copolymer having branches, for example, an ethylene-α-olefin copolymer, which can be POE. Although POE performs well in physical and mechanical properties and aging resistance, the crosslinking performances are less good. Therefore, although the branched polyethylene of the present invention can include both a branched ethylene homopolymer and POE, it is preferred that the branched polyethylene comprises a high proportion of or exclusively a branched ethylene homopolymer. In a preferred embodiment of the present invention, the branched polyethylene comprises exclusively a branched ethylene homopolymer.

In the further elaboration of the technical solution of the present invention, the branched polyethylene used is a branched ethylene homopolymer unless otherwise particularly specified.

The branched polyethylene used in the present invention is a kind of ethylene homopolymer having a degree of branching of not less than 50 branches/1000 carbon atoms, which may also be referred to as Branched Polyethylene or Branched PE. Currently, the synthesis method comprises mainly homopolymerizing ethylene following a "chain walking mechanism" in the presence of a late transition metal catalyst, where the late transition metal catalyst is preferably an (α-diimine)nickel/palladium catalyst. The nature of the chain walking mechanism refers to the fact that a n-hydrogen elimination reaction and a re-insertion reaction tend to occur in the polymerization of an olefin in the presence of a late transition metal catalyst, for example, an (α-diimine)nickel/palladium catalyst, thereby causing branching. The branches pendant to the backbone of such branched polyethylene may have different numbers of carbon atoms, and specifically 1-6 or more carbon atoms.

The production cost of an (α-diimine) nickel catalyst is significantly lower than that of an (α-diimine) palladium catalyst, and the (α-diimine) nickel catalyst has a high rate and high activity in catalyzing the polymerization of ethylene, and is thus more suitable for industrial application. Therefore, in the present invention, an (α-diimine) nickel catalyst is preferably used in the production of branched polyethylene through catalytic polymerization of ethylene.

The degree of branching of the branched polyethylene used in the present invention is preferably 50-130 branches/1000 carbon atoms, further preferably 60-130 branches/1000 carbon atoms, and further preferably 60-116 branches/1000 carbon atoms. The degree of branching is between that of a POE and EPM, constituting a new technical solution that is different from the prior art. Therefore, the rubber matrix of present invention has both excellent aging resistance and good crosslinking performances.

The crosslinking performances include factors such as crosslinking density and crosslinking rate, and are the specific manifestations of the crosslinking ability of the rubber matrix in the processing process.

The branched polyethylene used in the present invention preferably has a methyl branch content of 40% or more or 50% or more, and has a similarity in structure with the EPM. In terms of the crosslinking ability, the degree of branching (the content of tertiary carbon atom) and the steric hindrance around the tertiary carbon atom are the two main factors affecting the crosslinking ability of a saturated polyolefin. Compared with the EPM, the branched polyethylene used in the present invention has a low degree of branching, and since the branched polyethylene has branches with the carbon number of not less than 2, the steric hindrance around the tertiary carbon atom of the branched polyethylene used in the present invention is theoretically greater than that of the EPM. Taking the two factors into account, it can be inferred that the crosslinking ability of the branched polyethylene used in the present invention is weaker than that of the EPM and further weaker than that of the EPDM. However, the actual crosslinking ability of the partially branched polyethylene used in the present invention is close to, and can even be equal to or better than that of the EPDM. This means that the rubber composition of the present invention can achieve a good aging resistance while the crosslinking ability is not weakened, and can even have excellent crosslinking performances to achieve unexpected beneficial effects.

This may be explained by the fact that there may be an appropriate number of secondary branch structures on the branched polyethylene used in the preferred technical solution of the present invention. The so-called secondary branch structure refers to a branch structure that further exists on a branch, which is formed in the chain walking process. This structure is also called "branch-on-branch". Because the steric hindrance around the tertiary carbon atoms of the secondary branch is low, a crosslinking reaction is more likely to occur. Having a secondary branch structure is a significant distinction of the branched polyethylene used in the preferred technical solution of the present invention from the EPM or the conventional ethylene-α-olefin copolymer in the prior art.

It is a new technical solution to improve the crosslinking ability of a saturated polyolefin elastomer by using the secondary branch structure with lower steric hindrance. According to the technical solution of the present invention, it is also considered to be within the technical protection of the present invention to include a vinyl copolymer having a secondary branch structure or other saturated hydrocarbon polymers in the rubber matrix. The vinyl copolymer refers to a copolymer of ethylene with a branched α-olefin and has a secondary branch structure. The branched α-olefin may be selected from the group consisting of isobutene, 3-methyl-1-butene, 4-methyl-1-pentene, 3-methyl-1-pentene, 2-methyl-1-heptene, 3-methyl-1-heptene, 4-methyl-1-heptene, 5-methyl-1-heptene, and 6-methyl-1-heptene, and the comonomer may also include a common linear α-olefin.

It is generally believed in the prior art that the branched polyethylene produced in the presence of an (α-diimine) nickel catalyst is difficult to have a secondary branch structure that is at least difficult to fully identify, and the technical solution of the present invention also provides a new idea for analyzing the structure of the branched polyethylene.

Compared with the ethylene-propylene rubber, when branched polyethylene has an appropriate number of secondary branch structures, the crosslinking point of the branched polyethylene can be generated on the tertiary carbon of the backbone or on the branched tertiary carbon of the secondary structure during the peroxide crosslinking. Therefore, the rubber network formed by the peroxide crosslinking of the branched polyethylene has richer C—C bonding segments between the backbones than the ethylene-propylene rubber, which can effectively avoid the concentration of stress, and contribute to better mechanical properties.

In a further technical solution, the content of the initiator is 0.5-5 parts.

In a further technical solution, the cationic photoinitiator includes at least one of an aromatic diazonium salt, a diaryliodonium salt, a triarylsulfonium salt, an alkylsulfonium salt, a ferrocene salt, a sulfonyloxyketone and a triarylsiloxane, preferably at least one of triarylsulfonium hexafluorophosphate, ferrocene hexafluorophosphate, triphenylsulfonium hexafluoroantimonate, and didodecylbenzeneiodonium hexafluoroarsenate.

In a further technical solution, the free radical photoinitiator includes at least one of an intramolecular cleavage type photoinitiator and an intermolecular hydrogen abstraction type photoinitiator, preferably at least one of benzophenone, diphenylethanone, dialkoxyacetophenone, benzoin dimethyl ether, α-hydroxyisobutyrylbenzene, acylphosphine oxide, benzoin isopropyl ether, benzoin n-butyl ester, anthraquinone, and fluorenone.

In a further technical solution, the rubber composition also comprises auxiliary components, and based on 100 parts by weight, the auxiliary components include 0.1-5 parts of a crosslinking agent, 0.01-2 parts of an antioxidant, 3-25 parts of a plasticizer, 0-10 parts of a metal oxide, 0-200 parts of an inorganic filler, and 0.3-5 parts of a coupling agent.

In a further technical solution, the crosslinking agent includes at least one of triallyl cyanurate (TAC), triallyl isocyanurate (TAIC), trimethylolpropane triacrylate (TMPTA), trimethylolpropane trimethacrylate (TMPTMA), pentaerythritol triallyl ether, and pentaerythritol ester tetraallyl ether.

In a further technical solution, based on 100 parts by weight of the rubber matrix, the content of the crosslinking system is 0.5-3 parts.

In a further technical solution, the plasticizer includes at least one of polyethylene wax, pine tar, motor oil, aromatic oil, naphthenic oil, paraffin oil, microcrystalline wax, and coumarone resin.

In a further technical solution, the metal oxide includes at least one of zinc oxide, magnesium oxide, calcium oxide, lead monoxide, and lead tetraoxide.

In a further technical solution, the inorganic filler includes at least one of silica, calcium carbonate, talcum powder, calcined clay, magnesium silicate, magnesium carbonate, aluminum hydroxide, and magnesium hydroxide.

In a further technical solution, the coupling agent includes at least one of vinyl tris(2-methoxyethoxy)silane (A-172), 3-glycidoxypropyl trimethoxysilane (A-187), γ-mercaptopropyltrimethoxysilane (A-189), and 3-methacryloxypropyltrimethoxysilane (KH570).

In a further technical solution, the antioxidant includes at least one of 2,6-di-tert-butylphenol, 2,4,6-tri-tert-butylphenol, 4,4'-thiobis(6-tert-butyl-3-methylphenol), triphenyl phosphite, tris(2,4-di-tert-butylphenyl)phosphite (antioxidant 168), triisooctyl phosphite, tricresyl phosphate, pentaerythritol tetrakis(3-(3',5'-di-tert-butyl-4-hydroxyphenyl)propionate) (antioxidant 1010), dilauryl thiodipropionate (DLTP), lauryl-stearyl thiodipropionate or ditridecyl 3,3'-thiodipropionate.

In a further technical solution, based on 100 parts by weight, the rubber matrix comprises a branched polyethylene with a content represented as A, in which $10 \leq A \leq 100$, and an EPM and an EPDM with a total content represented as B, in which $0 \leq B \leq 90$; and the branched polyethylene is characterized by being an ethylene homopolymer having a degree of branching of 60-130 branches/1000 carbon atoms, a weight average molecular weight of 66,000-518,000, and a Mooney viscosity ML (1+4) at 125° C. of 6-102.

In a further technical solution, based on 100 parts by weight, the rubber matrix comprises A parts of a branched polyethylene, in which $10 \leq A \leq 100$, and B parts of EPM and EPDM in total, in which $0 \leq B \leq 90$; and the branched polyethylene is an ethylene homopolymer having a degree of branching of 70-116 branches/1000 carbon atoms, a weight average molecular weight of 201,000-436,000, and a Mooney viscosity ML (1+4) at 125° C. of 23-101.

In a further technical solution, based on 100 parts by weight, the rubber matrix comprises A parts of a branched polyethylene, in which $10 \leq A \leq 100$, and B parts of EPM and EPDM in total, in which $0 \leq B \leq 90$; and the branched polyethylene is an ethylene homopolymer having a degree of branching of 80-105 branches/1000 carbon atoms, a weight average molecular weight of 250,000-400,000, and a Mooney viscosity ML(1+4) at 125° C. of 40-95.

In a further technical solution, based on 100 parts by weight, the rubber matrix comprises A parts of a branched polyethylene, in which $10 \leq A \leq 100$, and B parts of EPM and EPDM in total, in which $0 \leq B \leq 90$; and the branched polyethylene is an ethylene homopolymer having a degree of branching of 80-105 branches/1000 carbon atoms, a weight average molecular weight of 268,000-356,000, and a Mooney viscosity ML(1+4) at 125° C. of 42-80.

In a further technical solution, the weight proportion of the diene monomer in the ethylene-propylene rubber is preferably 1%-14%, more preferably 3%-10%, and further preferably 4%-7%.

The rubber composition of the present invention may be present in the form of an uncrosslinked rubber mix, and may be present in the form of a vulcanized rubber after a further crosslinking reaction, and the vulcanized rubber may also be simply referred to as a vulcanizate.

The present invention further provides a method for processing the rubber composition, comprising the following steps:

Rubber mixing and molding: setting a temperature and rotor speed of an internal mixer, adding a rubber matrix, prepressing and mixing the rubber matrix, then adding remaining components sequentially, and discharging a rubber mix after sufficient mixing; after plasticating on an open mill, pressing the rubber mix into a specimen on a press vulcanizer, crosslinking the specimen under ultraviolet light radiation, and then allowing the specimen to stand.

The present invention further provides a wire which comprises a conductor layer and an insulating layer, and the insulating layer comprises the above rubber composition.

The present invention further provides a cable which comprises a conductor layer, an insulating layer and a sheathing layer, and at least one of the insulating layer and the sheathing layer comprises the above rubber composition.

The present invention further provides a method for producing the cable, comprising the following steps:

(1) rubber mixing: setting a temperature and rotor speed of an internal mixer, adding a rubber matrix, prepressing and mixing the rubber matrix, then adding remaining components sequentially, and discharging a rubber mix after sufficient mixing;

(2) extrusion and crosslinking: extruding the rubber mix by a double screw extruder to prepare a cable insulating material or sheathing material; then carrying out melt extrusion and coating on a cable conductive core to form the insulating layer, and immediately crosslinking the insulating layer in a molten-state on-line continuous form under ultraviolet light radiation in an ultraviolet light radiation crosslinking device; after inspection and cable formation, carrying out melt extrusion and coating to form the sheathing layer, and immediately crosslinking the sheathing layer in a molten-state on-line continuous form under ultraviolet light radiation in the ultraviolet light radiation crosslinking device; and (3) carrying out inspecting and lettering to obtain the finished cable.

The present invention further provides a medical catheter, and the rubber compound used comprises the above rubber composition.

The present invention further provides a method for producing the medical catheter, comprising the following steps:

(1) rubber mixing: setting a temperature and rotor speed of an internal mixer, adding a rubber matrix, prepressing and mixing a rubber matrix, then adding remaining components sequentially, and discharging the rubber mix after sufficient mixing;

(2) extrusion and vulcanization: extruding the rubber mix by a double screw extruder to obtain a rubber hose, and immediately crosslinking the rubber hose in a molten-state on-line continuous form under ultraviolet light radiation in an ultraviolet light radiation crosslinking device to obtain the medical catheter.

The present invention further provides a condom, and the rubber compound used comprises the above rubber composition.

The present invention further provides a method for producing the condom, comprising the following steps:

(1) rubber mixing: setting a temperature and rotor speed of an internal mixer, adding a rubber matrix, prepressing and mixing the rubber matrix, then adding remaining components sequentially, and discharging a rubber mix after sufficient mixing;

(2) latex preparation: dissolving the rubber mix in a solvent, and carrying out emulsification and dispersion to obtain latex; and (3) dip molding: dipping and drying a mold in the latex several times, and carrying out ultraviolet light radiation, crimping, demolding, finishing, electrical inspection, and packaging to finally obtain the condom.

The present invention further provides gloves, and the rubber compound used comprises the above rubber composition.

The present invention further provides a method for producing the gloves, comprising the following steps:

(1) rubber mixing: setting a temperature and rotor speed of an internal mixer, adding a rubber matrix, prepressing and mixing the rubber matrix, then adding remaining components sequentially, and discharging a rubber mix after sufficient mixing;

(2) latex preparation: dissolving the rubber mix in a solvent, and carrying out emulsification and dispersion to obtain latex; and (3) dip molding: cleaning and drying a mold, dipping the mold in a coagulating agent, drying the mold, dipping the mold in the latex, lifting up the mold, and carrying out ultraviolet light radiation crosslinking, standing, edge coating, crimping, demolding, and finishing to obtain the gloves.

The present invention has the following beneficial effects: a new rubber composition is provided, in which the ethylene-propylene rubber is partially or completely replaced by the branched polyethylene, and when the rubber composition is applied to the rubber products crosslinked by ultraviolet light, the rubber products have good mechanical strength while achieving excellent elasticity, electrical insulation properties, aging resistance and ozone resistance. The principle is as follows: since the molecular structure of branched polyethylene is completely saturated, the electrical insulation and heat aging resistance of the branched polyethylene are similar to those of EPM, and superior to those of EPDM; moreover, since the molecular structure of the branched polyethylene has more branches, and the length of the branches has a certain length distribution, the branched polyethylene may have an appropriate number of secondary branched structures; in a photo-crosslinking process, the crosslinking point of the branched polyethylene may be generated on the tertiary carbon of the backbone, or may be generated on the branched tertiary carbon of the secondary structure; therefore, a rubber network formed by photo-crosslinking of the branched polyethylene could have richer C—C bonding segments between the backbones than the ethylene-propylene rubber, which is similar to multi-sulfur linkage distribution in a sulfur vulcanizing system, effectively avoids concentration of stress, and contributes to better mechanical properties. Therefore, in general, when the rubber matrix contains the branched polyethylene, the rubber composition can obtain better mechanical strength after crosslinking by ultraviolet radiation, and can be well applied to the insulating layers of wires and cables. In addition, the new rubber composition has high mechanical strength and is free of protein, so the rubber composition has no allergy risk and can also be used to make films, condoms, gloves and other products.

DETAILED DESCRIPTION

The present invention is further described through examples, but such examples are not intended to limit the scope of the present invention. Some non-essential improvements and adjustments made by those skilled in the art to the present invention shall also fall within the protection scope of the present invention.

The specific examples of a rubber polymer provided by the present invention are as follows: a formulation of a rubber composition comprises a rubber matrix and an initiator, the rubber matrix comprises a branched polyethylene with a content represented as A, in which 0<A≤100, and an ethylene-propylene rubber with a content represented as B, in which 0≤B<100; and based on 100 parts by weight of the rubber matrix, the content of the initiator is 0.1-10 parts, preferably 0.5-5 parts. The initiator includes at least one of a cationic photoinitiator and a free radical photoinitiator. The branched polyethylene has a degree of branching of not less than 50 branches/1000 carbon atoms, a weight average molecular weight of not less than 50,000, and a Mooney viscosity ML(1+4) at 125° C. of not less than 2.

The preferred branched polyethylene has a degree of branching of 60-130 branches/1000 carbon atoms, a weight average molecular weight of 66,000-518,000, and a Mooney viscosity ML(1+4) at 125° C. of 6-102. The initiator includes at least one of a cationic photoinitiator and a free radical photoinitiator.

The cationic photoinitiator includes at least one of an aromatic diazonium salt, a diaryliodonium salt, a triarylsulfonium salt, an alkylsulfonium salt, a ferrocene salt, a sulfonyloxyketone and a triarylsiloxane, specifically at least one of triarylsulfonium hexafluorophosphate, ferrocene hexafluorophosphate, triphenylsulfonium hexafluoroantimonate, and didodecylbenzeneiodonium hexafluoroarsenate.

The free radical photoinitiator includes at least one of an intramolecular cleavage type photoinitiator and an intermolecular hydrogen abstraction type photoinitiator, specifically at least one of benzophenone, diphenylethanone, dialkoxyacetophenone, benzoin dimethyl ether, α-hydroxyisobutyrylbenzene, acylphosphine oxide, benzoin isopropyl ether, benzoin n-butyl ester, anthraquinone, and fluorenone.

The rubber composition also comprises auxiliary components, and based on 100 parts by weight, the auxiliary components include 0.1-5 parts of a crosslinking agent, 0.01-2 parts of an antioxidant, 3-25 parts of a plasticizer, 0-10 parts of metal oxide, 0-200 parts of an inorganic filler, and 0.3-5 parts of a coupling agent. The crosslinking agent includes at least one of triallyl cyanurate (TAC), triallyl isocyanurate (TAIC), trimethylolpropane triacrylate (TMPTA), trimethylolpropane trimethacrylate (TMPTMA), pentaerythritol triallyl ether, and pentaerythritol ester tetraallyl ether.

The plasticizer includes at least one of polyethylene wax, pine tar, motor oil, aromatic oil, naphthenic oil, paraffin oil, microcrystalline wax, and coumarone resin.

The metal oxide includes at least one of zinc oxide, magnesium oxide, calcium oxide, lead monoxide, and lead tetraoxide.

The inorganic filler includes at least one of silica, calcium carbonate, talcum powder, calcined clay, magnesium silicate, magnesium carbonate, aluminum hydroxide, and magnesium hydroxide.

The coupling agent includes at least one of vinyl tris(2-methoxyethoxy)silane (A-172), 3-glycidoxypropyltrimethoxysilane (A-187), γ-mercaptopropyltrimethoxysilane (A-189), and 3-methacryloxypropyltrimethoxysilane (KH570). The antioxidant includes at least one of 2,6-di-tert-butylphenol, 2,4,6-tri-tert-butylphenol, 4,4'-thiobis(6-tert-butyl-3-methylphenol), triphenyl phosphite, tris(2,4-di-tert-butylphenyl)phosphite (antioxidant 168), triisooctyl phosphite, tricresyl phosphate, pentaerythritol tetrakis(3-(3',5'-di-tert-butyl-4'-hydroxyphenyl)propionate) (antioxidant 1010), dilauryl thiodipropionate (DLTP), lauryl-stearyl thiodipropionate, and ditridecyl 3,3'-thiodipropionate.

In the present invention, the EPM and the EPDM used preferably have a Mooney viscosity ML (1+4) at 125° C. of 50-80, and preferably an ethylene content of 50%-70%. The third monomer used is 5-ethylidene-2-norbornene, 5-vinyl-2-norbornene or dicyclopentadiene, and the content of the third monomer is 1%-7%.

The branched polyethylene can be obtained by catalyzing homopolymerization of ethylene in the presence of an (α-diimine) nickel catalyst and a cocatalyst. The structure of the (α-diimine) nickel catalyst used, the synthesis method and the method for preparing branched polyethylene therewith are disclosed in the prior art, as described in, without limitation, CN102827312A, CN101812145A, CN101531725A, CN104926962A, U.S. Pat. Nos. 6,103,658, and 6,660,677.

The branched polyethylene used is characterized by having a degree of branching of 60-130 branches/1000 carbon atoms, a weight average molecular weight of 66,000-518,000, and a Mooney viscosity ML (1+4) at 125° C. of 6-102. The degree of branching is measured by $^1$H NMR, and the molar percentages of various branches are measured by $^{13}$C NMR.

The details are shown in a table below:

| Branched polyethylene No. | Degree of branching | Methyl/% | Ethyl/% | Propyl/% | Butyl/% | Pentyl/% | Hexyl or higher/% | Weight average molecular weight/10,000 | Molecular weight distribution | Mooney viscosity ML(1 + 4) at 125° C. |
|---|---|---|---|---|---|---|---|---|---|---|
| PER-1 | 130 | 46.8 | 18.3 | 8.3 | 6.7 | 5.2 | 14.7 | 6.6 | 2.2 | 6 |
| PER-2 | 116 | 51.2 | 17.6 | 8.2 | 5.8 | 5.1 | 12.1 | 20.1 | 2.1 | 23 |
| PER-3 | 105 | 54.0 | 13.7 | 6.4 | 5.3 | 5.1 | 15.5 | 26.8 | 2.1 | 42 |
| PER-4 | 102 | 56.2 | 12.9 | 6.2 | 5.2 | 4.9 | 14.6 | 27.9 | 2.1 | 52 |
| PER-5 | 99 | 59.6 | 11.6 | 5.8 | 4.9 | 5.1 | 13.0 | 28.3 | 1.8 | 63 |
| PER-6 | 90 | 62.1 | 9.4 | 5.4 | 4.6 | 4.5 | 14.0 | 32.1 | 2.1 | 77 |
| PER-7 | 82 | 64.2 | 8.7 | 5.3 | 4.2 | 3.9 | 13.7 | 35.6 | 1.7 | 80 |
| PER-8 | 70 | 66.5 | 7.2 | 4.6 | 3.2 | 3.2 | 15.3 | 43.6 | 2.1 | 93 |
| PER-9 | 60 | 68.1 | 7.1 | 4.2 | 2.7 | 2.8 | 15.1 | 51.8 | 2.2 | 102 |
| PER-10 | 87 | 61.8 | 10.3 | 5.4 | 4.6 | 4.9 | 12.0 | 40.1 | 1.8 | 101 |
| PER-11 | 94 | 60.5 | 10.8 | 5.7 | 4.7 | 4.9 | 13.3 | 37.8 | 2.0 | 85 |
| PER-12 | 102 | 56.8 | 12.7 | 6.1 | 5.2 | 5.1 | 13.9 | 34.8 | 1.9 | 66 |

Rubber Performance Test Methods:

1. Tensile strength and elongation at break performance test: The test is carried out with a type 2 dumbbell specimen using an electronic tensile tester at a tensile speed of 250 mm/min and a test temperature of 23±2° C. in accordance with the national standard GB/T 528-2009.

2. Mooney viscosity test: The test is carried out in accordance with the national standard GB/T 1232.1-2000, with a Mooney viscosity meter at a test temperature of 125° C. by preheating for 1 min, and the test is continued for 4 min.

3. Hot air accelerated aging test: The test is carried out at 135° C. for 168 h in accordance with the national standard GB/T 3512-2001, in a heat aging test chamber.

4. Volumetric resistivity test: The test is carried out using a megger in accordance with the national standard GB/T 1692-2008.

5. Oxygen index: The test is carried out in accordance with the national standard GB/T 2046.2-2009.

Ultraviolet light with a dominant wavelength of 200-400 nm and a light intensity of 400-4000 mW/cm$^2$ is used to carry out irradiation crosslinking at 160° C., and the lamp distance is controlled at 4-10 cm.

Example 1

Branched polyethylene No. PER-7 was used.
The processing and crosslinking steps were as follows:
(1) Rubber mixing and molding: The temperature of the internal mixer was set to 100° C., and the rotor speed was set to 50 rpm. 70 parts of EPDM and 30 parts of branched polyethylene were added, prepressed and mixed for 2 min. Then 1 part of benzoin dimethyl ether was added, and the rubber compound was mixed for 3 min and then discharged. After being plasticated on an open mill, the rubber mix was pressed into a 1 mm thick specimen on a press vulcanizer.
(2) The specimen was crosslinked under ultraviolet light radiation for 10 seconds, then allowed to stand for 16 h, and cut to be subjected to various tests.

Example 2

Branched polyethylene No. PER-7 was used.
The processing and crosslinking steps were as follows:
(1) Rubber mixing and molding: The temperature of the internal mixer was set to 100° C., and the rotor speed was set to 50 rpm. 50 parts of EPDM and 50 parts of branched polyethylene were added, prepressed and mixed for 2 min. Then 1 part of benzoin dimethyl ether was added, and the rubber compound was mixed for 3 min and then discharged. After being plasticated on an open mill, the rubber mix was pressed into a 1 mm thick specimen on a press vulcanizer.
(2) The specimen was crosslinked under ultraviolet light radiation for 10 seconds, then allowed to stand for 16 h, and cut to be subjected to various tests.

Example 3

Branched polyethylene No. PER-7 was used.
The processing and crosslinking steps were as follows:
(1) Rubber mixing and molding: The temperature of the internal mixer was set to 100° C., and the rotor speed was set to 50 rpm. 100 parts of branched polyethylene was added, prepressed and mixed for 2 min. Then 1 part of benzoin dimethyl ether was added, and the rubber compound was mixed for 3 min and then discharged. After being plasticated on an open mill, the rubber mix was pressed into a 1 mm thick specimen on a press vulcanizer.
(2) The specimen was crosslinked under ultraviolet light radiation for 10 seconds, then allowed to stand for 16 h, and cut to be subjected to various tests.

Comparative Example 1

The processing and crosslinking steps were as follows:
(1) Rubber mixing and molding: The temperature of the internal mixer was set to 100° C., and the rotor speed was set to 50 rpm. 100 parts of EPDM was added, prepressed and mixed for 2 min. Then 1 part of benzoin dimethyl ether was added, and the rubber compound was mixed for 3 min and then discharged. After being plasticated on an open mill, the rubber mix was pressed into a 1 mm thick specimen on a press vulcanizer.
(2) The specimen was crosslinked under ultraviolet light radiation for 8 seconds, then allowed to stand for 16 h, and cut to be subjected to various tests.

Example 4

Branched polyethylene No. PER-6 was used.
The processing and crosslinking steps were as follows:
(1) Rubber mixing and molding: The temperature of the internal mixer was set to 100° C., and the rotor speed was set to 50 rpm. 50 parts of EPDM and 50 parts of branched polyethylene were added, prepressed and mixed for 2 min. Then 3 parts of benzoin dimethyl ether and 1 part of trimethylolpropane triacrylate (TMPTA) were added, and the rubber compound was mixed for 3 min and then discharged. After being plasticated on an open mill, the rubber mix was pressed into a 1 mm thick specimen on a press vulcanizer.
(2) The specimen was crosslinked under ultraviolet light radiation for 8 seconds, then allowed to stand for 16 h, and cut to be subjected to various tests.

Example 5

Branched polyethylene No. PER-6 was used.
The processing and crosslinking steps were as follows:
(1) Rubber mixing and molding: The temperature of the internal mixer was set to 100° C., and the rotor speed was set to 50 rpm. 100 parts of branched polyethylene was added, prepressed and mixed for 2 min. Then 3 parts of benzoin dimethyl ether and 1 part of trimethylolpropane triacrylate (TMPTA) were added, and the rubber compound was mixed for 3 min and then discharged. After being plasticated on an open mill, the rubber mix was pressed into a 1 mm thick specimen on a press vulcanizer.
(2) The specimen was crosslinked under ultraviolet light radiation for 8 seconds, then allowed to stand for 16 h, and cut to be subjected to various tests.

Example 6

Branched polyethylene No. PER-9 was used.
The processing and crosslinking steps were as follows:
(1) Rubber mixing and molding: The temperature of the internal mixer was set to 100° C., and the rotor speed was set to 50 rpm. 30 parts of EPM, 60 parts of EPDM and 10 parts of branched polyethylene were added, prepressed and mixed for 2 min. Then 3 parts of paraffin oil SUNPAR2280, 0.1 part of the antioxidant 1010, 2.5 parts of triarylsulfonium hexafluorophosphate, 1 part of benzoin dimethyl ether and 1 part of trimethylolpropane triacrylate (TMPTA) were added, and the rubber compound was mixed for 3 min and then discharged. After being plasticated on an open mill, the rubber mix was pressed into a 1 mm thick specimen on a press vulcanizer.

(2) The specimen was crosslinked under ultraviolet light radiation for 8 seconds, then allowed to stand for 16 h, and cut to be subjected to various tests.

Example 7

Branched polyethylene No. PER-8 was used.
The processing and crosslinking steps were as follows:
(1) Rubber mixing and molding: The temperature of the internal mixer was set to 100° C., and the rotor speed was set to 50 rpm. 10 parts of EPM, 60 parts of EPDM, 30 parts of branched polyethylene and 0.1 part of the antioxidant 1010 were added, prepressed and mixed for 2 min. Then 5 parts of paraffin oil SUNPAR2280, 2.5 parts of triarylsulfonium hexafluorophosphate, 1 part of benzoin dimethyl ether and 1 part of trimethylolpropane triacrylate (TMPTA) were added, and the rubber compound was mixed for 3 min and then discharged. After being plasticated on an open mill, the rubber mix was pressed into a 1 mm thick specimen on a press vulcanizer.

(2) The specimen was crosslinked under ultraviolet light radiation for 8 seconds, then allowed to stand for 16 h, and cut to be subjected to various tests.

Comparative Example 2

Branched polyethylene No. PER-8 was used.
The processing and crosslinking steps were as follows:
(1) Rubber mixing and molding: The temperature of the internal mixer was set to 100° C., and the rotor speed was set to 50 rpm. 100 parts of EPDM was added, prepressed and mixed for 2 min. Then 3 parts of benzoin dimethyl ether and 1 part of trimethylolpropane triacrylate (TMPTA) were added, and the rubber compound was mixed for 3 min and then discharged. After being plasticated on an open mill, the rubber mix was pressed into a 1 mm thick specimen on a press vulcanizer.

(2) The specimen was crosslinked under ultraviolet light radiation for 8 seconds, then allowed to stand for 16 h, and cut to be subjected to various tests.

The performance test data of Examples 1-7 and Comparative Examples 1 and 2 are shown in the table below.

Example 8

Branched polyethylene No. PER-5 was used.
(1) Rubber mixing: The temperature of the internal mixer was set to 100° C., and the rotor speed was set to 50 rpm. 50 parts of EPDM, 50 parts of branched polyethylene, 0.8 part of the silane coupling agent KH570, 0.2 part of the antioxidant 1010 and 0.1 part of the antioxidant DLTP were added, prepressed and mixed for 2 min. Then 60 parts of calcined clay, 40 parts of talcum powder and 5 parts of paraffin oil SUNPAR2280 were added, and the rubber compound was mixed for 3 min. Then 3.5 parts of ferrocene tetrafluoroborate, 1 part of benzoin dimethyl ether and 2 parts of triallyl isocyanurate (TAIC) were added, and the rubber compound was mixed for 3 min and then discharged.

(2) Extrusion and crosslinking: The rubber mix was extruded into a cable material by a double screw extruder. Then the cable material was subjected to melt extrusion to form the insulating layer or the sheathing layer coating a cable conductive core. The insulating layer or the sheathing layer was crosslinked in a molten-state on-line continuous form under ultraviolet light radiation in an ultraviolet light radiation crosslinking device. The irradiation time was 10 seconds.

Example 9

Branched polyethylene No. PER-5 was used.
(1) Rubber mixing: The temperature of the internal mixer was set to 100° C., and the rotor speed was set to 50 rpm. 30 parts of EPDM, 70 parts of branched polyethylene, 0.8 part of the silane coupling agent KH570 and 0.2 part of the antioxidant 1010 were added, prepressed and mixed for 2 min. Then 60 parts of calcined clay, 40 parts of talcum powder and 5 parts of paraffin oil SUNPAR2280 were added, and the rubber compound was mixed for 3 min. Then 3 parts of benzoin dimethyl ether and 2 parts of triallyl isocyanurate (TAIC) were added, and the rubber compound was mixed for 3 min and then discharged.

(2) Extrusion and crosslinking: The rubber mix was extruded into a cable material by a double screw extruder. Then the cable material was subjected to melt extrusion to form the insulating layer or the sheathing layer coating a cable conductive core. The insulating layer or the sheathing layer was crosslinked in a molten-state on-line continuous form under ultraviolet light radiation in an ultraviolet light radiation crosslinking device. The irradiation time was 10 seconds.

| Test Item | Example 1 | Example 2 | Example 3 | Comparative Example 1 | Example 4 | Example 5 | Example 6 | Example 7 | Comparative Example 2 |
|---|---|---|---|---|---|---|---|---|---|
| Tensile strength/MPa | 8.6 | 10.3 | 11.2 | 7.4 | 11.3 | 13.2 | 10.5 | 11.2 | 9.2 |
| Elongation at break/% | 858 | 793 | 778 | 946 | 763 | 732 | 612 | 769 | 867 |
| Volumetric resistivity/$\Omega \cdot cm$ | $2.8 \times 10^{16}$ | $3.0 \times 10^{16}$ | $3.1 \times 10^{16}$ | $2.6 \times 10^{16}$ | $2.8 \times 10^{16}$ | $2.8 \times 10^{16}$ | $2.7 \times 10^{16}$ | $2.8 \times 10^{16}$ | $2.7 \times 10^{16}$ |
| After aging at 135° C. for 168 h | | | | | | | | | |
| Retention rate of tensile strength/% | 104 | 102 | 104 | 105 | 103 | 102 | 103 | 102 | 105 |
| Retention rate of elongation at break/% | 95 | 93 | 96 | 94 | 93 | 95 | 97 | 96 | 93 |

Example 10

Branched polyethylene No. PER-5 was used.

(1) Rubber mixing: The temperature of the internal mixer was set to 100° C., and the rotor speed was set to 50 rpm. 100 parts of branched polyethylene was added and prepressed, and 0.8 part of the silane coupling agent KH570, 0.2 part of the antioxidant 1010 and 0.1 part of the antioxidant DLTP were added and mixed for 2 min. Then 60 parts of calcined clay, 40 parts of talcum powder and 5 parts of paraffin oil SUNPAR2280 were added, and the rubber compound was mixed for 3 min. Then 3.5 parts of ferrocene tetrafluoroborate, 1 part of benzophenone and 2 parts of trimethylolpropane triacrylate (TMPTA) were added, and the rubber compound was mixed for 3 min and then discharged.

(2) Extrusion and crosslinking: The rubber mix was extruded into a cable material by a double screw extruder. Then the cable material was subjected to melt extrusion to form the insulating layer or the sheathing layer coating a cable conductive core. The insulating layer or the sheathing layer was crosslinked in a molten-state on-line continuous form under ultraviolet light radiation in an ultraviolet light radiation crosslinking device. The irradiation time was 10 seconds.

Comparative Example 3

(1) Rubber mixing: The temperature of the internal mixer was set to 100° C., and the rotor speed was set to 50 rpm. 100 parts of EPDM, 0.8 part of the silane coupling agent KH570 and 0.2 part of the antioxidant 1010 were added, prepressed and mixed for 2 min. Then 60 parts of calcined clay, 40 parts of talcum powder and 5 parts of paraffin oil SUNPAR2280 were added, and the rubber compound was mixed for 3 min. Then 3 parts of benzoin dimethyl ether and 2 parts of trimethylolpropane triacrylate (TMPTA) were added, and the rubber compound was mixed for 3 min and then discharged.

(2) Extrusion and crosslinking: The rubber mix was extruded into a cable material by a double screw extruder. Then the cable material was subjected to melt extrusion to form the insulating layer or the sheathing layer coating a cable conductive core. The insulating layer or the sheathing layer was crosslinked in a molten-state on-line continuous form under ultraviolet light radiation in an ultraviolet light radiation crosslinking device. The irradiation time was 10 seconds.

Example 11

Branched polyethylene Nos. PER-2 and PER-5 were used.

(1) Rubber mixing: The temperature of the internal mixer was set to 100° C., and the rotor speed was set to 50 rpm. 70 parts of PER-5, 30 parts of PER-2, 1 part of the silane coupling agent A-172 and 0.2 part of the antioxidant 1010 were added, prepressed and mixed for 2 min. Then 80 parts of calcined clay and 5 parts of paraffin oil SUNPAR2280 were added and the rubber compound was mixed for 3 min. Then 0.5 part of benzophenone and 1 part of trimethylolpropane triacrylate (TMPTA) were added, and the rubber compound was mixed for 3 min and then discharged.

(2) Extrusion and crosslinking: The rubber mix was extruded into a cable material by a double screw extruder. Then the cable material was subjected to melt extrusion to form the insulating layer or the sheathing layer coating a cable conductive core. The insulating layer or the sheathing layer was crosslinked in a molten-state on-line continuous form under ultraviolet light radiation in an ultraviolet light radiation crosslinking device. The irradiation time was 15 seconds.

Example 12

Branched polyethylene No. PER-3 was used.

(1) Rubber mixing: The temperature of the internal mixer was set to 100° C., and the rotor speed was set to 50 rpm. 50 parts of EPDM, 50 parts of branched polyethylene, 3 parts of zinc oxide, 0.3 part of the silane coupling agent A-172 and 0.3 part of the antioxidant 1010 were added, prepressed and mixed for 2 min. Then 10 parts of high-dispersibility silica, 40 parts of calcined clay and 5 parts of paraffin oil SUNPAR2280 were added, and the rubber compound was mixed for 3 min. Then 5 parts of ferrocene hexafluorophosphate, 5 parts of benzophenone and 3 parts of trimethylolpropane triacrylate (TMPTA) were added, and the rubber compound was mixed for 3 min and then discharged.

(2) Extrusion and crosslinking: The rubber mix was extruded into a cable material by a double screw extruder. Then the cable material was subjected to melt extrusion to form the insulating layer or the sheathing layer coating a cable conductive core. The insulating layer or the sheathing layer was crosslinked in a molten-state on-line continuous form under ultraviolet light radiation in an ultraviolet light radiation crosslinking device. The irradiation time was 10 seconds.

Example 13

Branched polyethylene No. PER-4 was used.

(1) Rubber mixing: The temperature of the internal mixer was set to 100° C., and the rotor speed was set to 50 rpm. 50 parts of EPDM, 50 parts of branched polyethylene, 0.3 part of the antioxidant 1010 and 0.2 part of DLTP were added, prepressed and mixed for 2 min. Then 150 parts of the silane coupling agent modified aluminum hydroxide and 10 parts of paraffin oil SUNPAR2280 were added, and the rubber compound was mixed for 3 min. Then 3 parts of ferrocene hexafluorophosphate, 2 parts of benzophenone and 0.5 part of trimethylolpropane triacrylate (TMPTA) were added, and the rubber compound was mixed for 3 min and then discharged.

(2) Extrusion and crosslinking: The rubber mix was extruded into a cable material by a double screw extruder. Then the cable material was subjected to melt extrusion to form the insulating layer or the sheathing layer coating a cable conductive core. The insulating layer or the sheathing layer was crosslinked in a molten-state on-line continuous form under ultraviolet light radiation in an ultraviolet light radiation crosslinking device. The irradiation time was 10 seconds.

Example 14

Branched polyethylene Nos. PER-1 and PER-7 were used.

(1) Rubber mixing: The temperature of the internal mixer was set to 100° C., and the rotor speed was set to 50 rpm. 80 parts of PER-7, 20 parts of PER-1, 0.3 part of the antioxidant 1010 and 0.2 part of the antioxidant DLTP were added, prepressed and mixed for 2 min. Then 180 parts of the silane coupling agent modified aluminum hydroxide, 20 parts of calcined clay and 10 parts of paraffin oil SUNPAR2280 were added, and the rubber compound was mixed for 3 min. Then 4.5 parts of ferrocene hexafluorophosphate, 3.5 parts of benzoin dimethyl ether and 1 part of trimethylolpropane triacrylate (TMPTA) were added, and the rubber compound was mixed for 3 min and then discharged.

(2) Extrusion and crosslinking: The rubber mix was extruded into a cable material by a double screw extruder. Then the cable material was subjected to melt extrusion to form the insulating layer or the sheathing layer coating a cable conductive core. The insulating layer or the sheathing layer was crosslinked in a molten-state on-line continuous form under ultraviolet light radiation in an ultraviolet light radiation crosslinking device. The irradiation time was 10 seconds.

The performance test data of the ultraviolet light crosslinked cable materials prepared in Examples 8-14 and Comparative Example 3 were as follows:

| Test Item | Example 8 | Example 9 | Example 10 | Comparative Example 3 | Example 11 | Example 12 | Example 13 | Example 14 |
|---|---|---|---|---|---|---|---|---|
| Tensile strength/MPa | 12.9 | 15.2 | 14.8 | 11.9 | 13.6 | 15.3 | 10.2 | 14.8 |
| Elongation at break/% | 456 | 553 | 516 | 587 | 673 | 428 | 419 | 343 |
| Volumetric resistivity/ $\Omega \cdot cm$ | $2.5 \times 10^{12}$ | $5.8 \times 10^{14}$ | $6.9 \times 10^{12}$ | $2.7 \times 10^{14}$ | $7.2 \times 10^{14}$ | $5.7 \times 10^{14}$ | $8.6 \times 10^{14}$ | $6.2 \times 10^{14}$ |
| After aging (at 135° C. for 168 h) | | | | | | | | |
| Retention rate of tensile strength/% | 106 | 105 | 106 | 108 | 105 | 105 | 106 | 107 |
| Retention rate of elongation at break/% | 94 | 96 | 95 | 94 | 96 | 96 | 93 | 94 |
| Oxygen index | | | | | | | 31 | 32 |

Examples of the present invention also include application of the above rubber composition for producing rubber products including wires and cables, films, gloves, condoms, and medical catheters.

The specific examples thereof are described below.

Example 15

A medical catheter was processed by the following steps:

Branched polyethylene Nos. PER-8 and PER-2 were used.

(1) Rubber mixing: The temperature of the internal mixer was set to 100° C., and the rotor speed was set to 50 rpm. 80 parts of PER-8, 20 parts of PER-2, 0.3 part of the antioxidant 1010 and 0.2 part of the antioxidant DLTP were added, prepressed and mixed for 2 min. Then 60 parts of talcum powder and 3 parts of paraffin oil SUNPAR2280 were added and the rubber compound was mixed for 3 min. Then 2 parts of ferrocene hexafluorophosphate, 2 parts of benzophenone and 1 part of trimethylolpropane triacrylate (TMPTA) were added, and the rubber compound was mixed for 3 min and then discharged.

(2) Extrusion and vulcanization: The rubber mix was extruded into a rubber hose by a double screw extruder, and the rubber hose was immediately crosslinked in a molten-state on-line continuous form under ultraviolet light radiation in an ultraviolet light radiation crosslinking device. The irradiation time was 15 seconds to obtain the medical catheter. The catheter material has a tensile strength of 18.5 MPa and an elongation at break of 680%, and meets the requirements of general medical catheters for various performances.

Example 16

A medical catheter was processed by the following steps:

Branched polyethylene No. PER-7 was used.

(1) Rubber mixing: The temperature of the internal mixer was set to 100° C., and the rotor speed was set to 50 rpm. 100 parts of PER-7, 0.3 part of the antioxidant 1010 and 0.2 part of the antioxidant DLTP were added, prepressed and mixed for 2 min. Then 40 parts of talcum powder and 3 parts of paraffin oil SUNPAR2280 were added and the rubber compound was mixed for 3 min. 0.1 part of benzophenone and 0.1 part of trimethylolpropane triacrylate (TMPTA) were added, and the rubber compound was mixed for 3 min and then discharged.

(2) Extrusion and vulcanization: The rubber mix was extruded into a rubber hose by a double screw extruder, and the rubber hose was immediately crosslinked in a molten-state on-line continuous form under ultraviolet light radiation in an ultraviolet light radiation crosslinking device. The irradiation time was 15 seconds to obtain the medical catheter. The catheter material has a tensile strength of 10.5 MPa and an elongation at break of 880%, and meets the requirements of general medical catheters for various performances.

Example 17

A condom was processed by the following steps:

Branched polyethylene Nos. PER-7 and PER-2 were used.

(1) Rubber mixing: The temperature of the internal mixer was set to 100° C., and the rotor speed was set to 50 rpm. 70 parts of PER-7, 30 parts of PER-4 and 0.2 part of the antioxidant DLTP were added, prepressed and mixed for 2 min. Then 2 parts of benzophenone and 1 part of trimethylolpropane triacrylate (TMPTA) were added, and the rubber compound was mixed for 3 min and then discharged.

(2) Latex preparation: The rubber mix was dissolved in normal octane, and emulsification and dispersion were carried out to obtain latex.

(3) Dip molding: A specific mold was dipped and dried in the latex several times, and ultraviolet light radiation for 30 seconds, crimping, demolding, finishing, electrical inspection, and packaging were carried out to finally obtain the condom. The condom has a thickness of 41 μm, a burst volume of 29 dm³, a burst pressure of 1.3 kPa, a tensile strength of 18.9 mpa, and an elongation at break of 768%, and meets the requirements of the international condom standard (55 EN ISO 4074: 2002 Natural latex rubber condoms: Requirements and test methods) for various performances.

Example 18

Gloves were processed by the following steps:
Branched polyethylene No. PER-7 was used.

(1) Rubber mixing: The temperature of the internal mixer was set to 100° C., and the rotor speed was set to 50 rpm. 100 parts of PER-7, 0.8 part of the silane coupling agent A-172, 0.3 part of the antioxidant 1010 and 0.2 part of the antioxidant DLTP were added, prepressed and mixed for 2 min. Then 20 parts of talcum powder was added and the rubber compound was mixed for 3 min. Then 2 parts of ferrocene hexafluorophosphate, 2 parts of benzophenone and 1 part of trimethylolpropane triacrylate (TMPTA) were added, and the rubber compound was mixed for 3 min and then discharged.

(2) Latex preparation: The rubber mix was dissolved in normal octane, and emulsification and dispersion were carried out to obtain latex.

(3) Dip molding: A mold was cleaned and dried, dipped in a coagulating agent, dried, dipped in the latex, and lifted up. Ultraviolet light radiation crosslinking for 30 seconds, standing, edge coating, crimping, demolding, and finishing were carried out to obtain the gloves. The gloves have a breaking tenacity of 8.3 N, an elongation of 780%, and an adhesion rate of 0, and meet the requirements of the national standard (GB 10213-2006 Single-use medical rubber examination glove) for various performances.

Example 19

A medical catheter uses branched polyethylene PER-12 as the rubber matrix, and the remaining formulation components and processing steps are same as Example 16.

The catheter material has a tensile strength of 13.4 MPa and an elongation at break of 810%, and meets the requirements of general medical catheters for various performances.

Example 20

A condom uses branched polyethylene PER-12 as the rubber matrix, and the remaining formulation components and processing steps are same as Example 17.

The obtained condom has a thickness of 32 μm, a burst volume of 31 dm$^3$, a burst pressure of 1.4 kPa, a tensile strength of 22.9 MPa, and an elongation at break of 733%, and meets the requirements of the international condom standard (55 EN ISO 4074: 2002 Natural latex rubber condoms: Requirements and test methods) for various performances.

Example 21

Gloves use branched polyethylene PER-11 as the rubber matrix, and the remaining formulation components and processing steps are same as Example 18.

The obtained gloves have a breaking tenacity of 11.8 N, an elongation of 660%, and an adhesion rate of 0, and meet the requirements of the national standard (GB 10213-2006 Single-use medical rubber examination glove) for various performances.

What is claimed is:

1. A rubber composition, comprising a rubber matrix and an initiator, wherein, based on 100 parts by weight of the rubber matrix, the rubber matrix comprises a branched polyethylene with a content represented as A, in which 0<A≤100, and an ethylene-propylene rubber with a content represented as B, in which 0≤B<100; based on 100 parts by weight of the rubber matrix, the initiator accounts for 0.1-10 parts, and the initiator includes at least one of a cationic photoinitiator and a free radical photoinitiator, wherein the branched polyethylene is an ethylene homopolymer having a degree of branching of from 60 to 105 branches/1000 carbon atoms, a weight average molecular weight of not less than 50,000, and a Mooney viscosity ML (1+4) at 125° C. of not less than 2.

2. The rubber composition according to claim 1, wherein the content of the initiator is 0.5-5 parts, based on 100 parts by weight of the rubber matrix.

3. The rubber composition according to claim 1, wherein the cationic photoinitiator comprises at least one of an aromatic diazonium salt, a diaryliodonium salt, a triarylsulfonium salt, an alkylsulfonium salt, a ferrocene salt, a sulfonyloxyketone and a triarylsiloxane, and the triarylsulfonium salt is triarylsulfonium hexafluorophosphate.

4. The rubber composition according to claim 1, wherein the free radical photoinitiator comprises at least one of an intramolecular cleavage type photoinitiator and an intermolecular hydrogen abstraction type photoinitiator, and the intramolecular cleavage type photoinitiator or the intermolecular hydrogen abstraction type photoinitiator is at least one of benzophenone, diphenylethanone, dialkoxyacetophenone, benzoin dimethyl ether, α-hydroxyisobutyrylbenzene, acylphosphine oxide, benzoin isopropyl ether, benzoin n-butyl ester, anthraquinone, and fluorenone.

5. The rubber composition according to claim 1, wherein the rubber composition further comprises auxiliary components, and based on 100 parts by weight of the rubber matrix, the auxiliary components comprise 0.1-5 parts of a crosslinking agent, 0.01-2 parts of an antioxidant, 3-25 parts of a plasticizer, 0-10 parts of a metal oxide, 0-200 parts of an inorganic filler, and 0.3-5 parts of a coupling agent.

6. The rubber composition according to claim 5, wherein the crosslinking agent comprises at least one of triallyl cyanurate, triallyl isocyanurate, trimethylolpropane triacrylate, trimethylolpropane trimethacrylate, pentaerythritol triallyl ether, and pentaerythritol ester tetraallyl ether.

7. The rubber composition according to claim 5, wherein the plasticizer comprises at least one of polyethylene wax, pine tar, motor oil, aromatic oil, naphthenic oil, paraffin oil, microcrystalline wax, and coumarone resin; the metal oxide comprises at least one of zinc oxide, magnesium oxide, calcium oxide, lead monoxide, and lead tetraoxide; the inorganic filler comprises at least one of silica, calcium carbonate, talcum powder, calcined clay, magnesium silicate, magnesium carbonate, aluminum hydroxide, and magnesium hydroxide; the coupling agent comprises at least one of vinyl tris(2-methoxyethoxy)silane, 3-glycidoxypropyltrimethoxysilane, γ-mercaptopropyltrimethoxysilane, and 3-methacryloxypropyltrimethoxysilane; the antioxidant comprises at least one of 2,6-di-tert-butylphenol, 2,4,6-tritert-butylphenol, 4,4'-thiobis(6-tert-butyl-3-methylphenol), triphenyl phosphite, tris(2,4-di-tert-butylphenyl)phosphite, triisooctyl phosphite, tricresyl phosphate, pentaerythritol tetrakis(3-(3',5'-di-tert-butyl-4'-hydroxyphenyl)propionate), dilauryl thiodipropionate, lauryl-stearyl thiodipropionate, and ditridecyl 3,3'-thiodipropionate.

8. The rubber composition according to claim 1, wherein based on 100 parts by weight of the rubber matrix, the rubber matrix comprises a branched polyethylene with a content represented as A, in which 10≤A≤100, said ethylene-propylene rubber is consisted of EPM and EPDM, and the EPM and EPDM with a total content represented as B, in which 0≤B≤90; and the branched polyethylene is characterized by having a degree of branching of from 80 to 105 branches/1000 carbon atoms, a weight average molecular weight of 66,000-518,000, and a Mooney viscosity ML (1+4) at 125° C. of 6-102.

9. A wire, comprising a conductor layer and an insulating layer, wherein, said insulating layer comprises a rubber compound according to claim 1.

10. A cable, comprising a conductor layer, an insulating layer and a sheathing layer, wherein, said insulating layer and sheathing layer comprises a rubber compound according to claim 1.

11. A photo-crosslinked rubber product, wherein, the rubber compound used for said photo-crosslinked rubber product comprises said rubber composition according to claim 1.

12. The photo-crosslinked rubber product according to claim 11, wherein, said photo-crosslinked rubber product is a medical catheter.

13. The photo-crosslinked rubber product according to claim 11, wherein, said photo-crosslinked rubber product is a condom.

14. The photo-crosslinked rubber product according to claim 11, wherein, said photo-crosslinked rubber product is a glove.

* * * * *